United States Patent
Zebaze et al.

(10) Patent No.: US 10,706,574 B2
(45) Date of Patent: Jul. 7, 2020

(54) METHOD AND APPARATUS FOR IDENTIFYING A GAP BETWEEN OBJECTS IN AN IMAGE

(71) Applicant: STRAXCORP PTY LTD, Melbourne (AU)

(72) Inventors: Roger Zebaze, Coburg (AU); Yu Peng, Box Hill (AU)

(73) Assignee: STRAXCORP PTY LTD, Melbourne, Victoria (AU)

( * ) Notice: Subject to any disclaimer, the term of this patent is extended or adjusted under 35 U.S.C. 154(b) by 200 days.

(21) Appl. No.: 15/756,485

(22) PCT Filed: Sep. 2, 2016

(86) PCT No.: PCT/AU2016/050834
§ 371 (c)(1),
(2) Date: Feb. 28, 2018

(87) PCT Pub. No.: WO2017/035602
PCT Pub. Date: Mar. 9, 2017

(65) Prior Publication Data
US 2018/0268561 A1    Sep. 20, 2018

(30) Foreign Application Priority Data
Sep. 4, 2015   (AU) ................................ 2015903625

(51) Int. Cl.
*G06K 9/00*   (2006.01)
*G06T 7/62*   (2017.01)
(Continued)

(52) U.S. Cl.
CPC ................ *G06T 7/62* (2017.01); *G06T 5/002* (2013.01); *G06T 7/0012* (2013.01); *G06T 7/12* (2017.01);
(Continued)

(58) Field of Classification Search
CPC ......... G06T 7/0012; G06T 2207/10081; G06T 2207/10116; G06T 2207/3008;
(Continued)

(56) References Cited

U.S. PATENT DOCUMENTS 4,729,019 A * 3/1988 Rouvrais ............... G01S 7/5206
                                                          348/163
6,067,366 A * 5/2000 Simanovsky ...... G06K 9/00771
                                                          345/424
(Continued)

FOREIGN PATENT DOCUMENTS

EP       1450304 A1     8/2004
WO    1996015719 A1     5/1996

OTHER PUBLICATIONS

Extended European Search Report for corresponding European Patent Application No. 16840431.7 dated Jul. 20, 2018, 8 pages.
(Continued)

*Primary Examiner* — Ian L Lemieux
(74) *Attorney, Agent, or Firm* — Merchant & Gould P.C.

(57) ABSTRACT

A computer-implemented method for identifying a gap between objects in an image, the method comprising: detecting contours of the objects in the image or in a binarized version thereof; locating at least one path or gap between the objects, in the image or in an intersection region being a portion of the image containing at least respective portions of the objects by: determining representative attenuations or densities of respective one or more rows and columns of the image or of the intersection region, identifying first pixels, being pixels in a column that has a representative attenuation or density of 0, and second pixels, being pixels in a row that has a representative attenuation or density of 0, determining whether there exists a path or gap between two or more boundaries by identifying at least one first or second pixel on each of two or more of the boundaries, and detecting one or
(Continued)

more paths between the at least two boundaries; and outputting a result indicative of one or more detected paths.

20 Claims, 8 Drawing Sheets

(51) Int. Cl.
| | |
|---|---|
| *G06T 7/12* | (2017.01) |
| *G06T 7/13* | (2017.01) |
| *G06T 5/00* | (2006.01) |
| *G06T 7/00* | (2017.01) |

(52) U.S. Cl.
CPC ...... *G06T 7/13* (2017.01); *G06T 2207/10081* (2013.01); *G06T 2207/20192* (2013.01); *G06T 2207/30008* (2013.01); *G06T 2207/30172* (2013.01)

(58) Field of Classification Search
CPC ....... G06T 7/0002; G06T 7/0085; G06T 7/11; G06T 7/12; G06T 7/001; G06T 7/0081; G06T 7/13; G06T 2200/24; G06T 2207/10072; G06T 2207/10101; G06T 2207/10132; G06T 2207/20068; G06T 2207/20101; G06T 2207/20116; G06T 2207/20132; G06T 2207/20161; G06T 2207/20212; G06T 2207/30012; G06T 2207/30021; G06T 2207/30061; G06T 2207/30101; G06T 2207/30168; G06T 2207/30004; G06T 2207/30112; G06T 5/007; G06T 2200/04; G06T 7/0004; G06T 7/0051; G06T 7/0083; G06T 7/155; G06T 7/602; G06T 7/62; G06K 9/4647; G06K 9/00771; G06K 2209/05; G06K 2209/09; G06K 9/342; G06K 9/4604; G06K 9/4638; G06K 9/52; G06K 9/6267; G06K 2209/01; G06K 2209/013; G06K 9/00; G06K 9/00375; G06K 9/34; G06K 9/469; A61B 6/505
See application file for complete search history.

(56) References Cited

U.S. PATENT DOCUMENTS

| | | | |
|---|---|---|---|
| 6,078,642 A * | 6/2000 | Simanovsky ...... | G06K 9/00771 378/15 |
| 7,215,806 B1 | 5/2007 | Bechwati et al. | |
| 7,609,871 B2 | 10/2009 | Ruth et al. | |
| 8,174,552 B2 | 5/2012 | Swanson | |
| 8,538,117 B2 | 9/2013 | Najarian et al. | |
| 8,995,739 B2 | 3/2015 | Xiao et al. | |
| 9,014,452 B2 | 4/2015 | Xiao et al. | |
| 9,977,140 B2 * | 5/2018 | Wang ................ | A61B 6/032 |
| 2002/0191823 A1 * | 12/2002 | Wehrli ................ | A61B 5/417 382/128 |
| 2008/0143718 A1 * | 6/2008 | Ray .................. | G06K 9/4638 345/424 |
| 2010/0135578 A1 * | 6/2010 | Nakamura ........... | G06K 9/38 382/190 |
| 2010/0215225 A1 * | 8/2010 | Kadomura ........... | G06T 7/0012 382/128 |
| 2012/0075638 A1 | 3/2012 | Rollins et al. | |
| 2012/0232375 A1 * | 9/2012 | Zebaze ............... | G06T 7/0012 600/407 |
| 2013/0163836 A1 * | 6/2013 | Pau .................. | G06T 7/00 382/128 |
| 2013/0287300 A1 | 10/2013 | Chulinin | |
| 2015/0228063 A1 | 8/2015 | Minakawa et al. | |
| 2016/0048957 A1 * | 2/2016 | Kim .................. | G06T 5/005 382/131 |
| 2016/0058408 A1 * | 3/2016 | Kim .................. | G06T 7/11 382/131 |

OTHER PUBLICATIONS

Australian Patent Office, International Search Report, Dec. 16, 2016.

* cited by examiner

METHOD AND APPARATUS FOR IDENTIFYING A GAP BETWEEN OBJECTS IN AN IMAGE

RELATED APPLICATION

This application is based on and claims the benefit of the filing and priority dates of Australian patent application no. 2015903625 filed 4 Sep. 2015, the content of which as filed is incorporated herein by reference in its entirety.

FIELD OF THE INVENTION

A present invention relates to a method and system for identifying a gap between—or 'separating'—two or more objects or structures in an image, and is of particular but by no means exclusive application in the analysis of biological tissue including the analysis of bone (in vivo or otherwise) images. In a particular embodiment, the invention relates to the identification of a gap between two bone cross sections so that they can be separated from each other (i.e. segmented) and characterized. In another particular embodiment, the invention relates to the location or identification of a gap within in more or more part of an object or structure.

BACKGROUND OF THE INVENTION

The identification and separation of one or more objects within an image by existing techniques may involve segmentation, whereby the digital image is partitioned into multiple groups of pixels or voxels that share the same characteristics and hence into image segments. Segmentation is used in image analysis in many if not all areas, including medicine, multimedia, robotics, assembly line and public surveillance.

There are many methods of image segmentation (including thresholding, clustering, edge detection, region-growing and split-and-merge techniques). While they are all very useful, more often than not no single method is sufficient to accurately separate or segment two or more objects within an image. A combination of methods is hence often required, but even then the combination is often insufficient to enable separation of two adjacent object. Segmentation accuracy determines the eventual success or failure of computerized analysis procedures. However, segmentation of non-trivial images is one of the most difficult tasks in image analysis. The accuracy is always deteriorated by noises, and becomes even more challenging when the gaps between different objects are very small.

SUMMARY OF THE INVENTION

According to a first broad aspect of the present invention, there is provided a computer-implemented method for identifying a gap between objects in an image, the method comprising:
  detecting contours of the objects in the image or in a binarized version thereof;
  locating at least one path or gap between the objects, in the image or in an intersection region (such as a rectangular intersection region) being a portion of the image containing at least respective portions of the objects by:
    determining representative attenuations or densities of respective one or more rows and columns of the image or of the intersection region;
    identifying first pixels, being pixels in a column that has a representative attenuation or density of 0, second pixels, being pixels in a row that has a representative attenuation or density of 0, and third pixels, being pixels both in a column that has a representative attenuation or density of 0 and in a row that has a representative attenuation or density of 0;
    determining whether there exists a path or gap between two or more boundaries by identifying at least one first or second pixel on each of two or more of the boundaries; and
    detecting one or more paths between the at least two boundaries; and
  outputting a result indicative of one or more detected paths;
  wherein identifying the at least one first or second pixel on each of two or more of the boundaries excludes the third pixels from consideration when analyzing subdivisions of the image or of the intersection region.

The method thus allows the detection of areas, each containing an object or part of an object and background, the identification of any intersection between these areas, and the identification of a path or paths that separate different objects. The method thereby enables, in many applications, the identification of the gaps between objects (which may be structures within a larger object). The method may also be effective when the two objects are close. The method employs thresholding, edge detection, and region growing but, rather than segmenting the object from the background, identifies a zone or area where only one object and the background are present. By segmenting these zones the objects can be segmented more easily and gaps within an object can be detected.

The method may be of value in identifying a fracture, lesion or other discontinuity in the object, which may be of particular value in the analysis of images of bone.

The method may further comprise locating at least one path or gap between the objects in subdivisions of the image or of the intersection region, the subdivisions having a width and a height of at least one pixel, including determining representative attenuations or densities of the respective one or more rows and columns in the subdivisions.

The method may further comprise equalizing a histogram of the image to produce an equalized image.

The method may further comprise binarizing the image or a equalized version thereof to produce a binarized image.

The method may further comprise filtering the image or a binarized version thereof to remove noise while retaining informative edges.

The method may further comprise applying an erode kernel to the image or to a binarized version thereof.

The method may further comprise defining regions bounded by two or more longest of the contours.

In an embodiment, locating the at least one path or gap includes attempting to locate at least one path or gap in the intersection region and in one or more of the subdivisions, or in a plurality of the subdivisions. For example, locating the at least one path or gap may include attempting to locate at least one path or gap in the intersection region and in all of the subdivisions.

In another embodiment, the method comprises defining a plurality of sets of subdivisions of respective sizes.

In an embodiment, the representative attenuations or densities are average attenuations or densities.

In one embodiment, the method comprises detecting one or more optimal paths from the detected paths.

In another embodiment, the method comprises determining whether a path or gap is likely to exist between a plurality of boundaries of the intersection region by identifying pixels on two or more of the boundaries with values indicative of background pixels. In one example, the method includes repeatedly binarizing the intersection region with the binarization threshold successively increased until it is determined whether the path or gap is likely to exist.

In one embodiment, the method comprises converting the image into a grey-scale image.

Outputting the result may comprise displaying the one or more detected paths between the objects.

According to a second broad aspect of the present invention, there is provided a system for identifying a gap between objects in an image, the system comprising:

a contour detector configured to detect contours of the objects in the image or in a binarized version thereof;
    a path finder configured to locate at least one path or gap between the objects, in the image or in an intersection region being a portion of the image containing at least respective portions of the objects by:
        determining representative attenuations or densities of respective one or more rows and columns of the image or of the intersection region;
        identifying first pixels, being pixels in a column that has a representative attenuation or density of 0, second pixels, being pixels in a row that has a representative attenuation or density of 0, and identifying third pixels, being pixels both in a column that has a representative attenuation or density of 0 and in a row that has a representative attenuation or density of 0;
        determining whether there exists a path or gap between two or more boundaries by identifying at least one first or second pixel on each of two or more of the boundaries; and
        detecting one or more paths between the at least two boundaries; and
    an output configured to output a result indicative of one or more detected paths;
    wherein the path finder is configured to exclude the third pixels from consideration when analyzing the subdivisions to identify the at least one first or second pixel on each of two or more of the boundaries.

The path finder may be further configured to locate at least one path or gap between the objects in subdivisions of the image or of the intersection region, the subdivisions having a width and a height of at least one pixel, including determining representative attenuations or densities of the respective one or more rows and columns in the subdivisions.

The system may further comprise an image equalizer configured to equalize a histogram of the image to produce an equalized image.

The system may further comprise an image binarizer configured to binarize the image or a equalized version thereof to produce a binarized image.

The system may further comprise a filter configured to filter the image or a binarized version thereof to remove noise while retaining informative edges.

The system may further comprise an erode kernel applicator configured to apply an erode kernel to the image or to a binarized version thereof.

The system may further comprise a region definer configured to define regions bounded by two or more longest of the contours.

In an embodiment, the path finder is further configured to attempt to locate at least one path or gap in the intersection region and in one or more of the subdivisions, or in a plurality of the subdivisions. In one example, the path finder is further configured to attempt to locate at least one path or gap in the intersection region and in all of the subdivisions.

In another embodiment, the path finder is further configured to define a plurality of sets of subdivisions of respective sizes.

The representative attenuations or densities may be average attenuations or densities.

The system may further comprise an optimal path detector configured to detect one or more optimal paths from the detected paths.

The path finder may be further configured to determine whether a path or gap is likely to exist between a plurality of boundaries of the intersection region by identifying pixels on two or more of the boundaries with values indicative of background pixels. For example, the image binarizer may be configured to repeatedly binarize the intersection region with the binarization threshold successively increased until the image binarizer determines whether the path or gap is likely to exist.

The system may further comprise a grey-scale converter configured to convert the image into a grey-scale image.

The system may be further configured to display the one or more detected paths between the objects.

According to this aspect there is also provided a system for identifying a gap between objects in an image, the system comprising: a processor configured to (a) detect contours of the objects in the image or in a binarized version thereof; and (b) locate at least one path or gap between the objects, in the image or in an intersection region being a portion of the image containing at least respective portions of the objects by: determining representative attenuations or densities of respective one or more rows and columns of the image or of the intersection region; identifying first pixels, being pixels in a column that has a representative attenuation or density of 0, second pixels, being pixels in a row that has a representative attenuation or density of 0, and identifying third pixels, being pixels both in a column that has a representative attenuation or density of 0 and in a row that has a representative attenuation or density of 0; determining whether there exists a path or gap between two or more boundaries by identifying at least one first or second pixel on each of two or more of the boundaries; and detecting one or more paths between the at least two boundaries; and an output configured to output a result indicative of one or more detected paths; wherein the processor is further configured to exclude the third pixels from consideration when analyzing the subdivisions to identify the at least one first or second pixel on each of two or more of the boundaries.

According to a third broad aspect of the present invention, there is provided computer program configured, when executed by one or more processors, to implement the method of the first broad aspect. According to this aspect, there is also provided a computer readable medium (such as a non-transitory computer readable medium), comprising such a computer program.

It should be noted that any of the various individual features of each of the above aspects of the invention, and any of the various individual features of the embodiments described therein including in the claims, can be combined as suitable desired.

BRIEF DESCRIPTION OF THE DRAWING

In order that the invention may be more clearly ascertained, embodiments will now be described, by way of example, with reference to the accompanying drawing, in which.

DETAILED DESCRIPTION

Figure 1:
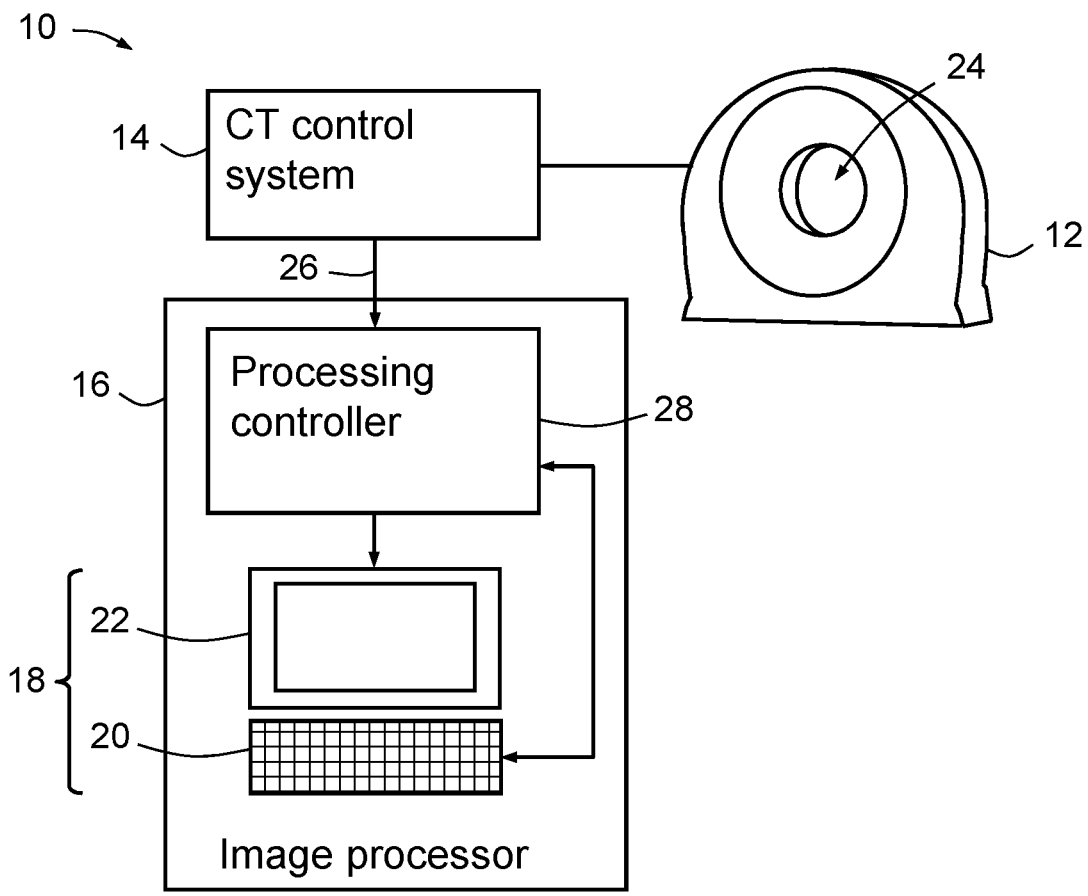
FIG. 1 is a schematic view of a system for identifying a gap between two or more objects or structures in an image according to an embodiment of the present invention.

According to an embodiment of the present invention, there is provided a system for identifying the gap between two or more objects (where 'objects' includes structures or portions of objects) in an image (such as of a portion of bone), shown schematically at 10 in FIG. 1. It should be noted that, in this art, identifying a gap may be referred to as 'separating' the two or more objects. System 10 may hence be useful in—for example—identifying or locating more precisely the objects, or in distinguishing one object from another.

System 10 comprises a CT scanner 12, CT control system 14 and an image analyser in the form of image processor 16. Image processor 16 includes a user interface 18 comprising an input device and an output device. The input device is in the form of a keyboard 20 for controlling image processor 16, and the output device is in the form of a display 22 for displaying images from the CT scanner 12 before and after processing by image processor 16. CT scanner 12 is configured to perform CT scans of a sample located within central scanning volume 24 of CT scanner 12 and to output digitized scan data to CT control system 14; CT control system 14 is configured to generate image data from the data received from CT scanner 12, and to output these image data to image processor 16.

In this embodiment, the image data constitutes an image slice through the sample but, in other embodiments, other sections may be used (such as coronal, transverse or oblique sections).

It will be appreciated that system 10 may operate in online and off-line modes. In the online mode, image processor 16 receives data directly from CT control system 14 (during or soon after scanning the sample). Such an arrangement may be used in a clinical setting, especially if the analysis (such as of a bone) is urgent. In this online mode, the data is transmitted to image processor 16 via a data link (connected to respective USBs of the CT control system 14 and image processor 16) or a communications network (to which CT control system 14 and image processor 16 are both connected, such as in the form of the internet); this link or network is shown schematically in FIG. 1 at 26.

In the off-line mode, image processor 16 receives data collected earlier by CT scanner 12 and CT control system 14; the data may be transmitted to image processor 16 via communications link or network 26, or by any other suitable means (including on portable computer readable medium, such as CD-ROM, flash card or the like).

Image processor 16 includes a processing controller 28 that is in data communication with input 20 and output 22 and configured to process image processing instructions in accordance with a processing procedure (discussed below) and to output processing outcomes (which may comprise images and/or detection results) to display 22.

Figure 2:
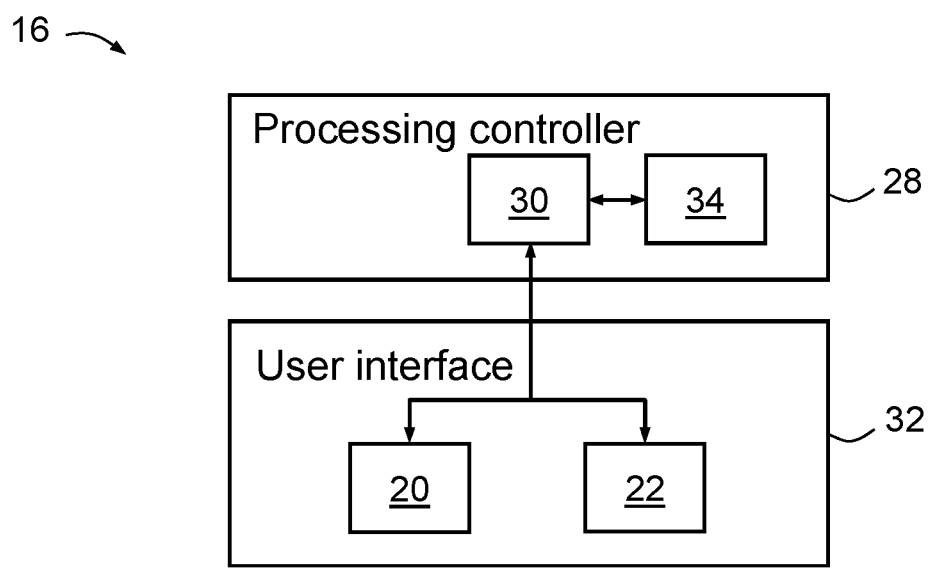
FIG. 2 is a schematic view of the image processor of the system of FIG. 1.

Referring to FIG. 2, processing controller 28 comprises a digital processor 30 that processes the processing instructions in accordance with the processing procedure and—and described above—outputs processing outcomes to display 22. Keyboard 20 and display 22 together constitute a user interface 32. Typically, the processing instructions are stored as program code in a memory 34 of processing controller 28 but can also be hardwired. Herein the term "processor" is used to refer generically to any device that can process processing instructions in accordance with the processing procedure and may comprise: a microprocessor, microcontroller, programmable logic device or other computational device, a general purpose computer (e.g. a PC) or a server.

Figure 3:
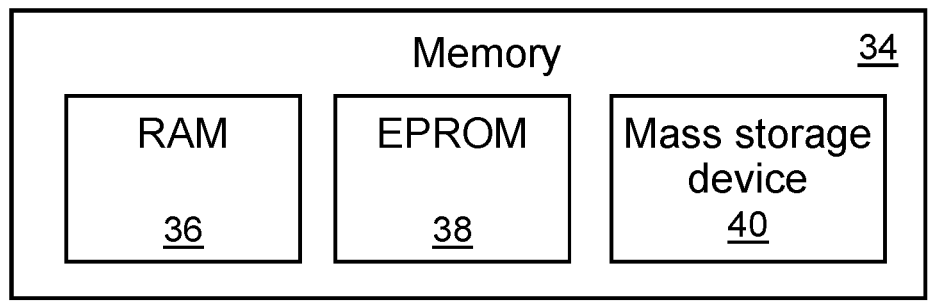
FIG. 3 is a schematic view of the memory of the processing controller of the image processor of the system of FIG. 1.

FIG. 3 shows a block diagram of the main components of memory 34. Memory 34 includes RAM 36, EPROM 38 and a mass storage device 40. RAM 36 typically temporarily holds program files for execution by the processor 30 and related data. EPROM 38 may be a boot ROM device and/or may contain some system or processing related code. Mass storage device 40 is typically used for processing programs.

Figure 4:
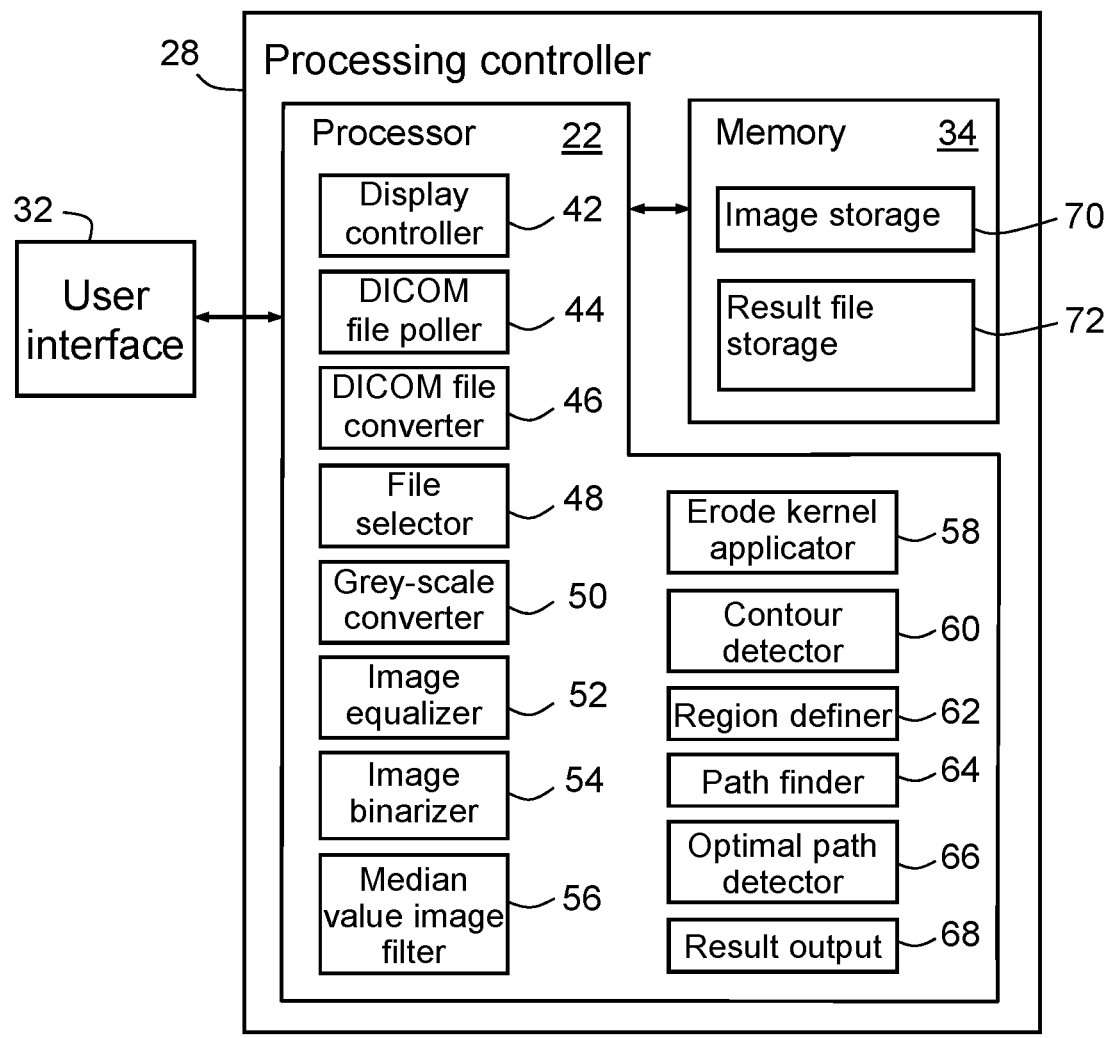
FIG. 4 is another, more detailed schematic view of the image processor of the system of FIG. 1.

FIG. 4 is another schematic view of user interface 32 and processing controller 28 of system 10 of FIG. 1, with more detail shown in processing controller 28. Specifically, processor 30 of processing controller 28 includes a display controller 42 for controlling display 22, a DICOM file poller 44 for polling DICOM (Digital Imaging and Communications in Medicine') files from a staging area (typically CT control system 14), a DICOM file converter 46 for converting DICOM files into images for display, a file selector 48 controllable to select a file to be analyzed by image processor 16, a grey-scale converter 50 for converting the image in the selected file into grey-scale, an image equalizer 52 for equalizing the histogram of the image once converted into grey-scale (in order to normalize the brightness and increases the contrast of the image), an image binarizer 54 for binarizing an equalized image using a suitable threshold, a median value image filter 56 for removing noise while retaining informative edges, an erode kernel applicator 58 for applying a small erode kernel to smoothed binary images, a contour detector 60 for detecting contours, a region definer 62, a path finder 64, an optimal path detector 66 and a result output 68.

Memory 34 of processing controller 28 includes an image storage 70 and a result file storage 72.

The processing instructions that embody the processing procedure are in the form, as described above, of program code stored in memory 34, and are adapted to control processing controller 26 to perform the processing procedure described below. Image processor 16 receives (in either online or off-line mode) a DICOM file (collected-possibly in vivo—of a sample of bone in this example) by polling CT control system 14, and stores the file in image storage 70 of memory 34. The received file, in this embodiment, is a DICOM file but in other embodiments may be in a different image format, such as JPEG or TIFF. Several such files may be stored in image storage 70, so a user may employ file selector 48 to choose and load the desired image.

Figure 5A:
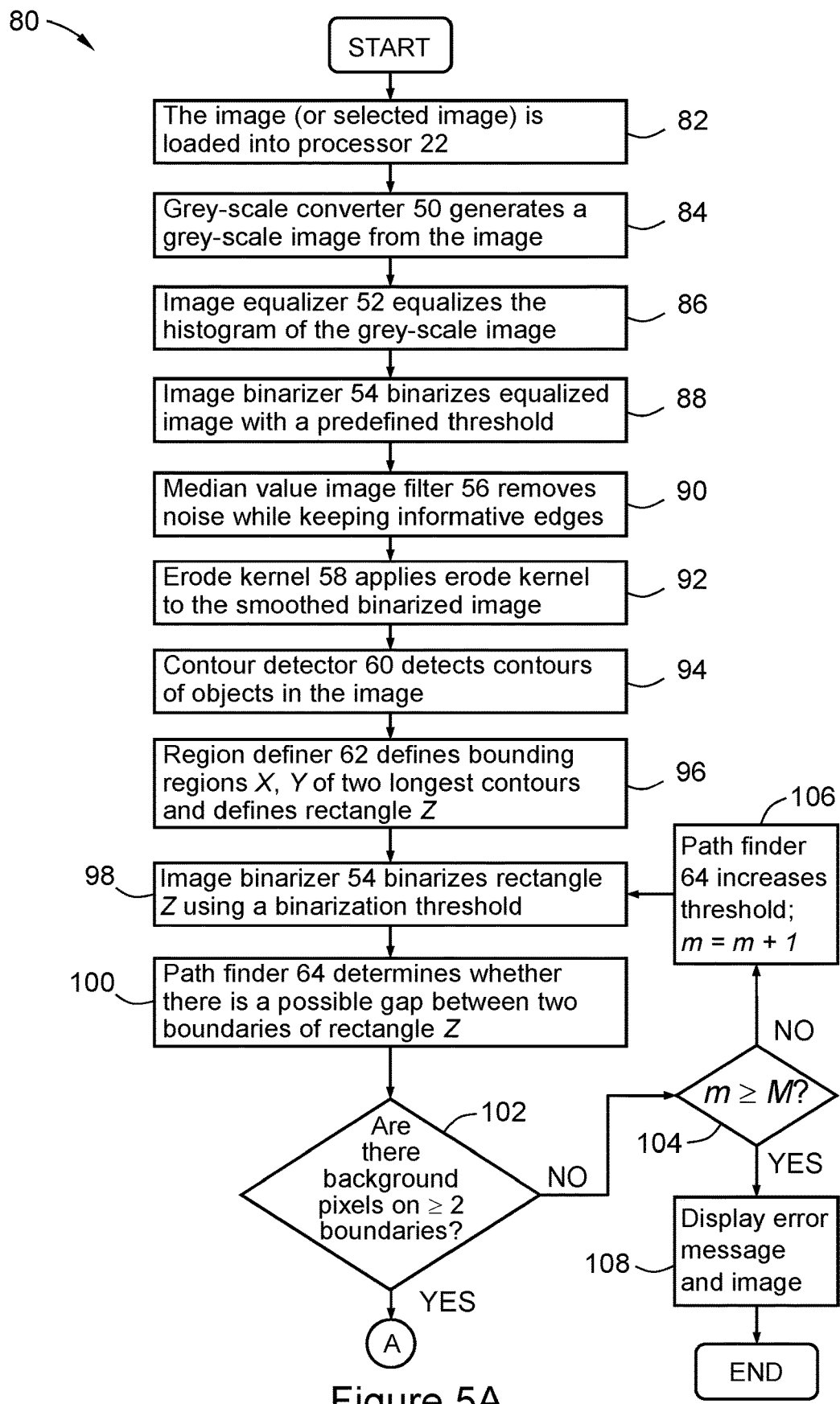
FIGS. 5A and 5B are a flow diagram of the image processing method (including path detection) implemented by the system of FIG. 1.
Figure 5B:
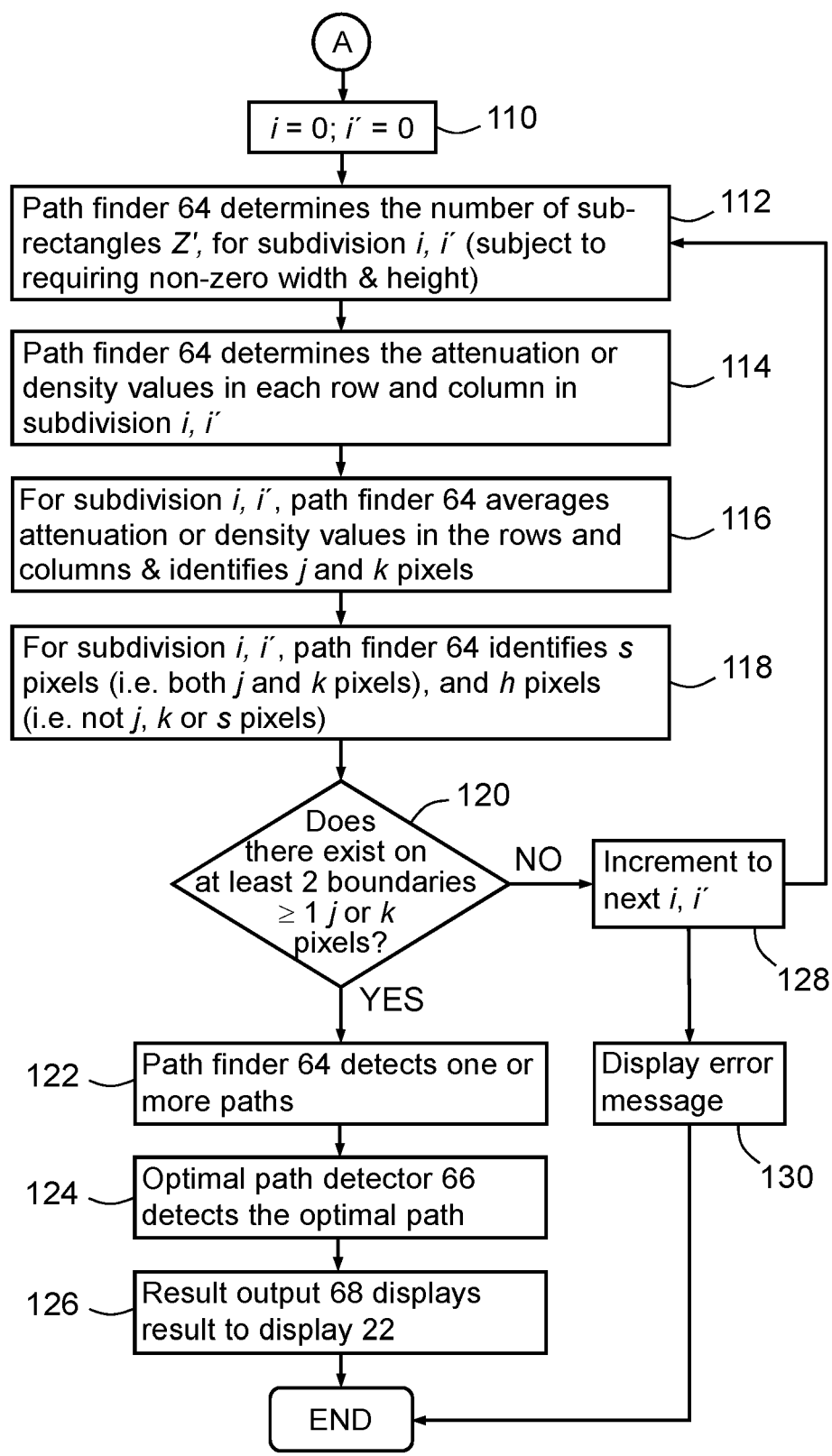
Figure 8A:
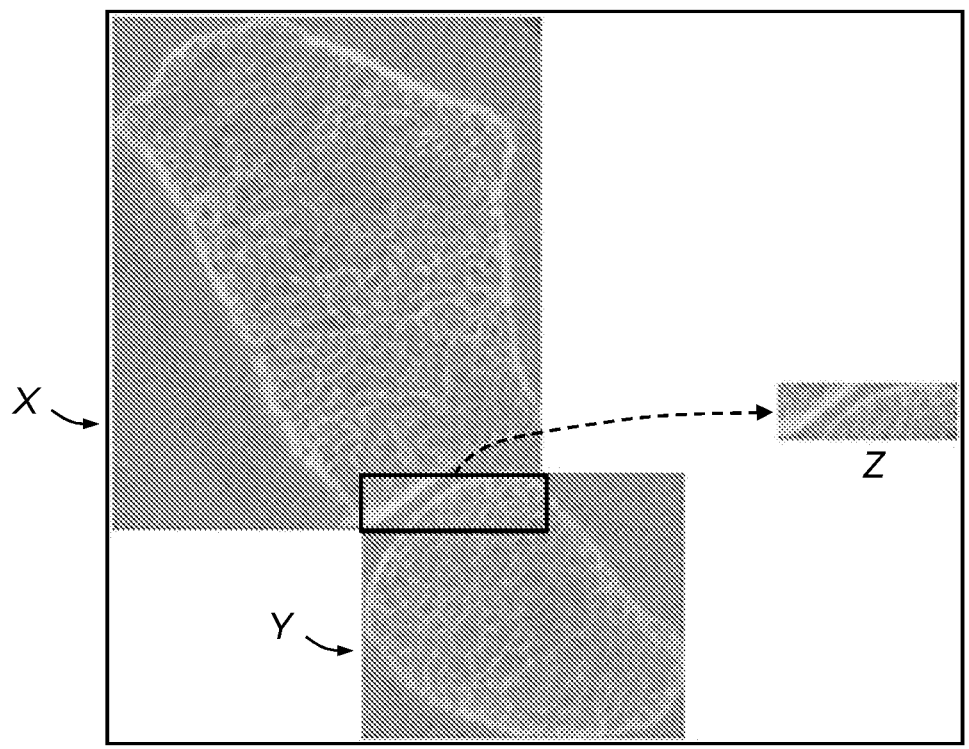
FIGS. 8A and 8B illustrate the defining of first and second rectangles X and Y, and the extraction for analysis of an intersecting rectangle Z, according to the image processing method implemented by the system of FIG. 1.
Figure 8B:
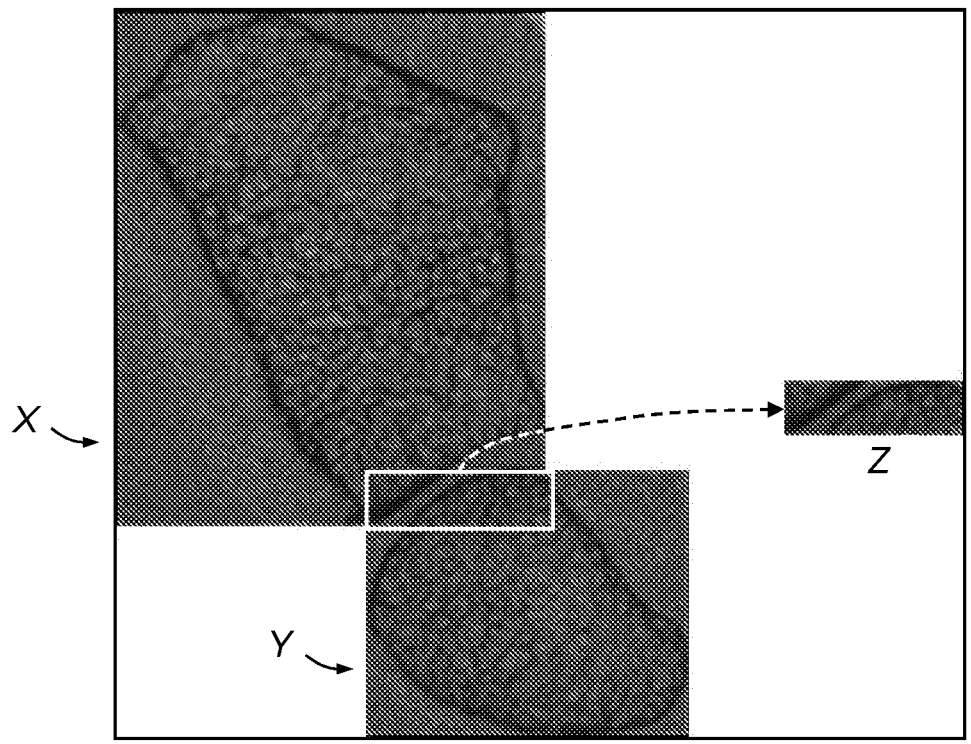

The core components of the image processing are then conducted, as shown in flow diagram 80 of FIGS. 5A and 5B. The effect on an image of the principal steps is also illustrated in FIG. 6A to 6F (or equivalently FIGS. 7A to 7F, which are negative versions of FIGS. 6A to 6F), and FIG. 8A (or equivalently FIG. 8B, which is a negative version of FIG. 8A).

Thus, at step 82, the image (or a selected image) is loaded into processor 22. At step 84, grey-scale converter 50 converts the image into a grey-scale image (wherein, herein, 'grey-scale' is used to refer to any monotone format) or otherwise generates a grey-scale image derived from the image (see the exemplary grey-scale image of FIG. 6A).

Figure 6A:
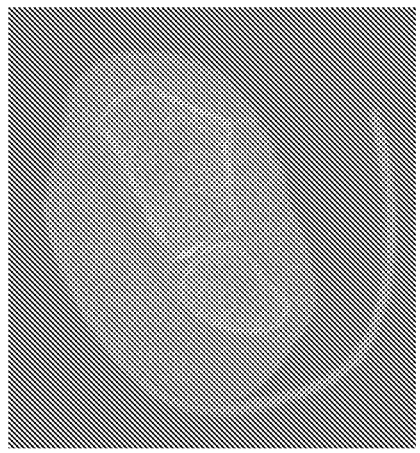
FIGS. 6A to 6F are successive versions of an image as processed according to the image processing method implemented by the system of FIG. 1.
Figure 6B:
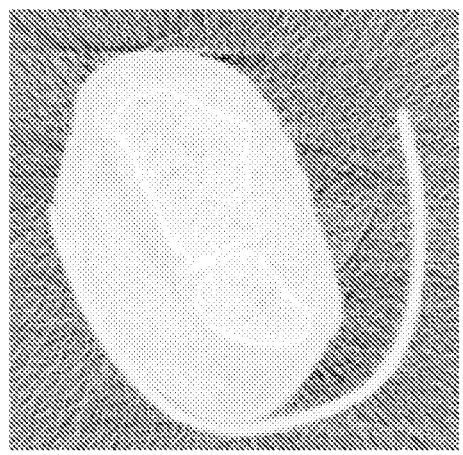

At step 86, image equalizer 52 equalizes the histogram of the grey-scale image to produce an equalized image (see exemplary equalized image of FIG. 6B). This operation normalizes the brightness and increases the contrast of the image. In this embodiment, for example, this may be done by:

i) calculating a histogram H for the grey-scale image;
ii) normalizing the histogram so that the sum of histogram bins is a predefined value, such as 255;
iii) computing the sum or integral H', of the histogram: $H'_i = \Sigma_{o \leq j < i} H(j)$; and
iv) transforming the image using $H'_i$ as a look-up table, such that:

$$dst(x,y) = H'(src(x,y))$$

Figure 6C:
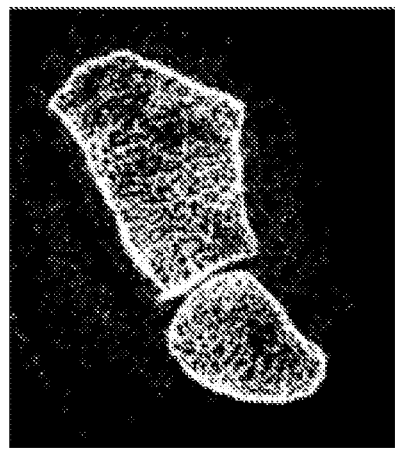

At step 88, image binarizer 54 binarizes the equalized image with a predefined threshold (selected, for example, empirically from previous analysis of comparable materials) to produce a binarized image (see exemplary binarized image of FIG. 6C). In the example of bone segmentation, bone material has a very high intensity value, compared with the background material. After equalizing the intensity histogram, it is possible to distinguish bone from the background using a high threshold value (such as 250 mgHA/cc, that is, 250 milligrams of hydroxyapatite per cubic centimetre).

Figure 6D:
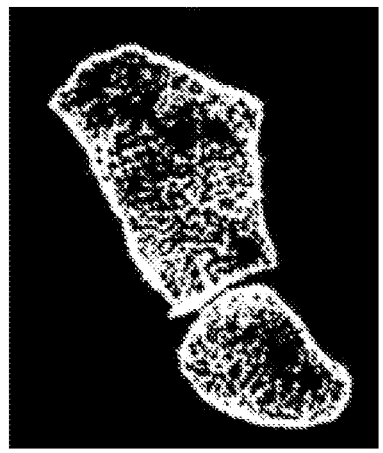
Figure 6E:
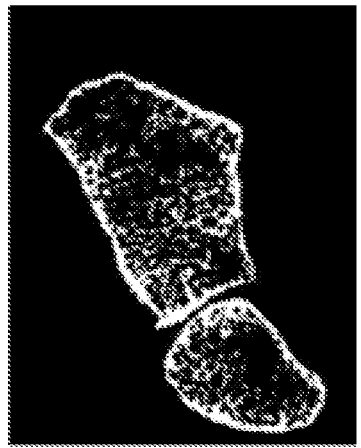
Figure 6F:
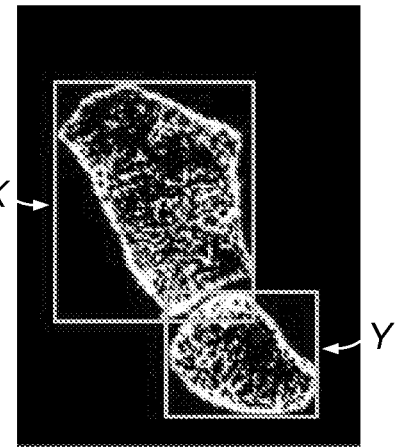
Figure 7A:
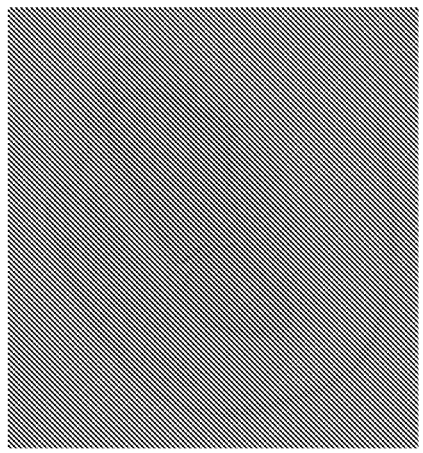
FIGS. 7A to 7F are the negative versions of the images of FIGS. 6A to 6F.
Figure 7B:
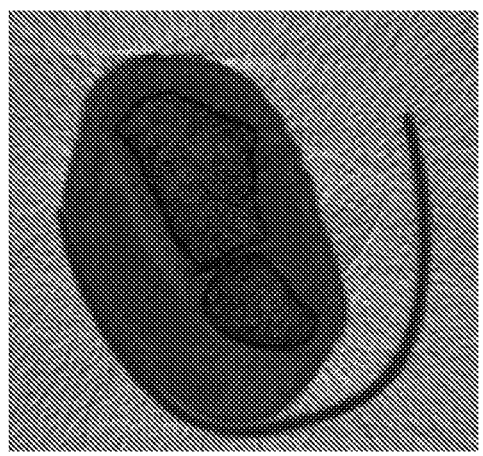
Figure 7C:
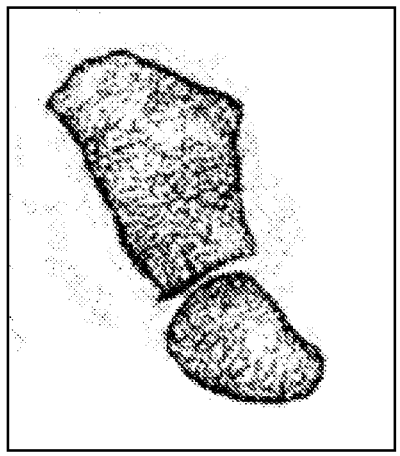
Figure 7D:
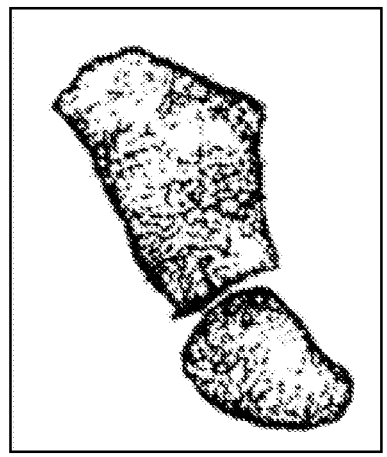
Figure 7E:
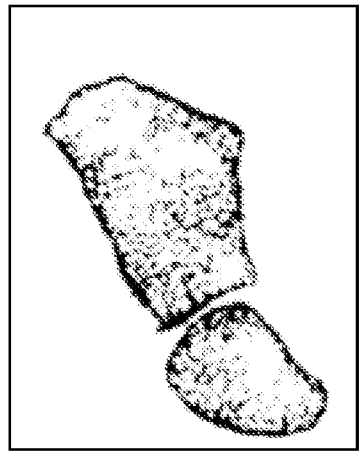
Figure 7F:
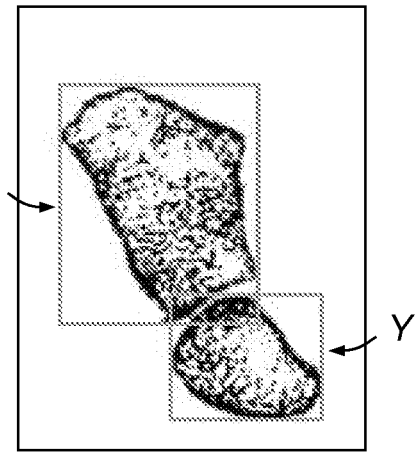

At step 90, after image binarization, median value image filter 56 may be applied to the binarized image, to remove noise while keeping informative edges (see exemplary noise-removed image of FIG. 6D). At step 92, erode kernel applicator 58 may apply an erode kernel (in this embodiment, a small (e.g. 2×2, 4×4, 5×5 or, as in this example, 3×3) erode kernel) to the smoothed binarized image (see exemplary eroded image of FIG. 6E). This step deals with the case that two bones are very close to each other, so 'small' should be understood in that context.

At step 94, contour detector 60 detects the contours of the objects in the binarized image obtained in step 92 and, at step 96, region definer 62 defines regions (in this example in the form of rectangles) bounded by the two longest of these contours, and hence in this example rectangles X, Y (see FIGS. 6A to 6F and 8A), which bound respectively the longest and second-longest contours. This step has the effect of defining an intersection region or selection Z of the original image comprising the intersection of the bounding regions (viz. rectangles X, Y) and allows the retention of edges of selection Z; in the example of a rectangular selection, the edges of the selection are termed herein, for convenience, the two horizontal (or lower and upper) edges denoted here C and D respectively and the two vertical (or left and right) edges denoted here as E and F respectively.

Figure 9:
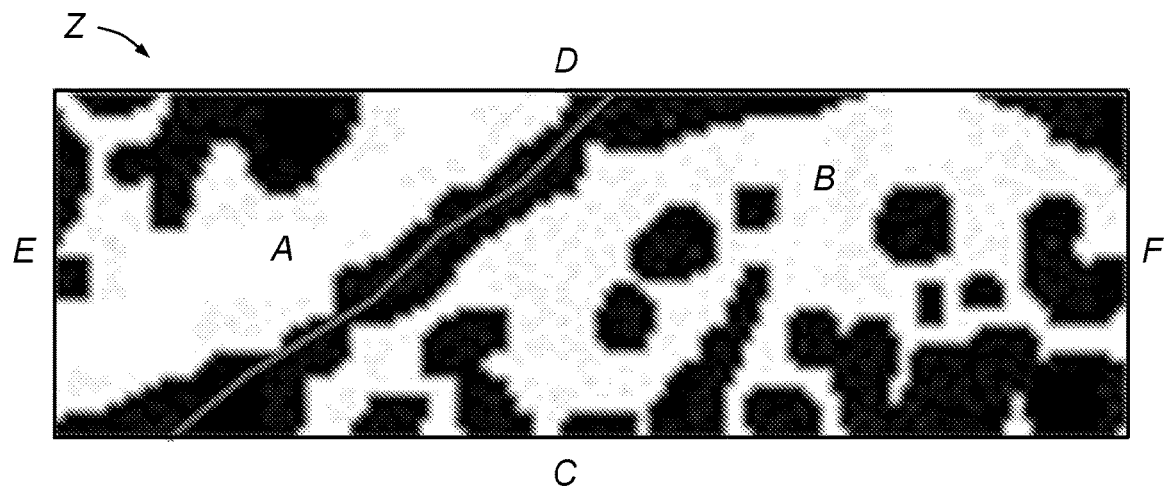
FIG. 9 illustrates the determination of a gap between two objects in intersecting rectangle Z, according to the image processing method implemented by the system of FIG. 1.

The rectangular selection Z resulting from the image of FIG. 6A is shown in FIG. 9. It should be noted that, while in this example rectangular selection Z extracted from the image under analysis contains portions of two objects (A and B), in other embodiments, the rectangular selection may contain three or more, or indeed many, objects.

At step 98, image binarizer 54 binarizes rectangle Z, using a binarization threshold. In this example, this binarization threshold may be initially automatically selected to be the same as the threshold established for use in step 88. The resulting binarized rectangle Z image contains two categories of pixels: (i) background and (ii) pixels with values similar to those found in rectangles A and B.

At step 100 path finder 64 determines whether a path or gap is likely to exist between two boundaries (e.g. two opposite boundaries) of rectangle Z such that a separation between objects A and B can be achieved. For convenience, the pixels on the edges of the binarized selection are named according to the edge on which they lie. In the example of the rectangular selection, rectangle Z, therefore, in which the edges are denoted C (bottom edge), D (top edge), E (left edge) and F (right edge), the pixels on the edges are denoted, respectively, C pixels, D pixels, E pixels and F pixels. Determining whether a path is likely to exist between any two boundaries C, D, E and F involves identifying pixels on two (or more) such boundaries with values indicative of the background.

Referring, therefore, to FIG. 5A, at step 102 path finder 64 determines whether there exist background pixels on two or more boundaries. If not, it may be necessary for path finder 64 to increase the binarization threshold, but first processing continues at step 104, where path finder 64 determines whether the binarization threshold has already been incremented in response to such an occurrence an excessive number of times; it does this by checking whether a counter m (which is initially one) has been incremented to a predefined maximum value of M, indicative of the maximum number of binarization threshold values to be checked. It will be appreciated that the maximum number of increments may be set in other ways, such as by defining a maximum acceptable value of the binarization threshold, which itself may be expressed in absolute terms, relative to the range of pixel values or as a percentage greater than the initial binarization threshold.

If the threshold has not been incremented too often (i.e. m<M, so the maximum number of thresholds values have not been checked), processing continues at 106, where path finder 64 increases the threshold used to binarize the image in step 98 by a preselected or predefined increment, then increments m by 1. A lack of the existence of background pixels signifies that all background has been captured by the threshold so, to 'show' the background, the binarization threshold value is increased.

Processing then returns to step 98 where the image is binarized again by image binarizer 54, though with the increased threshold. This may be repeated several times until the binarization threshold is effective in providing background pixels on two or more boundaries.

However, if repeated incrementing of the threshold fails to achieve this outcome, such that, at step 104, m≥M, it is likely that the edges of the objects within the rectangular selection lie on 3 or more edges of the rectangular selection and that there is no path joining 2 or more edges of the rectangular selection. This is unlikely eventuality, but if it arises, processing continues at step 108 where system 10 displays an error message on display 22 indicating that no gap can be detected and displays the image on display 22 for manual checking. Processing then ends.

If, at step 102, path finder 64 determines that there do exist background pixels on two or more boundaries, processing continues at step 110 where counters i and i' are set to 0. These counters are used, as explained below, in controlling the dividing of the intersection region—in this example rectangle Z—into i vertical and i' horizontal subdivisions that are then analyzed successively, a process that is repeated from i and i'=0 to i=n and i'=n' respectively, where n is the number of pixels in the vertical (E and F) direction and n' is the number of pixels in the horizontal (D and C) direction. The minimum number of subdivisions is 0 and corresponds to i or i'=0, that is, rectangle Z is analysed in its entirety. This maximum number of divisions in either direction is reached only if a gap has not been found. It should be noted that the order in which the subdivisions are defined and considered is not critical. Counters i and i' could be initially set to any desired initial values (e.g. n and n' respectively), provided all or sufficient values are treated such that a path between the object(s)—if present—will be found and, preferably, that—if more than one path exists—the optimal path is found.

Thus, at the current value of i and i', path finder 64 determines at step 112 the number of sub-rectangles Z' according to the instant subdivision i, i'. According to this embodiment, the number of sub-rectangles Z' according to subdivision i, i' is (i+1)×(i'+1).

At step 114, path finder 64 determines the attenuation or density values in each row and column of subdivision i, i'. At step 116, path finder 64 determines representative values of the attenuation or density values of the respective rows and columns of subdivision i, i', in this example by averaging the individual values, and identifies pixels in any column that has a resulting representative attenuation or density value of 0 as j pixels and pixels in any row that has a resulting representative attenuation or density value of 0 as k pixels. At step 118, path finder 64 identifies pixels that are both j and k pixels (each of which hence lies at the intersection of a column of j pixels and a row of k pixels), denoted s pixels, and pixels that are not j, k or s pixels, denoted h pixels.

It should be noted that in other embodiments, the identification of pixels j and k may be done not by averaging along the row or the column but adding, subtracting, multiplying or any other suitable operation.

Next, path finder 64 determines whether there exists a path or gap between any two or more boundaries (in this example, boundaries C, D, E and F). To do so, at step 120 path finder 64 determines whether there exists at least one j or k pixel on each of two or more of the boundaries (being $(CD_i, j)$ $(EF_{i'}, k)$, pixels). (It should be noted that s pixels instead of j and k pixels when i and i' are both equal to zero.) If so, the vertical and/or the horizontal lines corresponding to these pixels identify the gap with the line $(CD_0, j_x)$ and/or the line $(EF_0, k_x)$, where x is the position of the j pixel along D and/or the position of k pixel along E. As the gap has been found, at step 122 path finder 64 detects one or more paths (as described below), at step 124 optimal path detector 66 detects the at least one optimal valid path (as described below), and at step 126 result output 68 displays the result to display 22. The result is indicative of at least one identified (valid) path, and preferably includes the one or more optimal paths. The result may comprise the image or processed form thereof in which such path or paths are depicted.

Processing then ends.

It will be noted that step 120 is performed, in this example, for each subdivision i, i' before the next subdivision is considered at step 112. However, alternatively step 120 could be performed only once steps 112 to 118 have been performed for certain selected values of of i, i', or for all values of i, i', as is most computationally efficient or prompt.

If at step 120 such j and k pixels do not exist, processing continues at step 128 where path finder 64 in effect abandons the current subdivision and proceeds to the next subdivision by increasing i and/or i' so as to move to the next subdivision. In this embodiment, this may be done by incrementing i from 0 to its maximum value while i' remains fixed, then i' is incremented by 1 and i is again incremented from 0 to its maximum value, etc. However, in other embodiments a different increment function or algorithm may be used to increase i and/or i', provided that all values of i, i' are successively selected.

Processing then returns to step 112 with the new value of i, i' and path finder 64 re-analyzes the image to identify j and k pixels as described above. As there may be many sub-rectangles Z' for a particular subdivision i, i', the identification of j and k pixels does not mean that the gap between the objects A and B has been found, as some j and k pixels may not be located on boundaries C, D, E or F.

It should be noted that, at step 128, path finder 64 checks whether i, i' already have the values n and n' (or, in alternative implementations, whatever the indices of the last subdivision are), respectively, before incrementing them. This is to ensure that a subdivision is not defined with sub-rectangles Z' with a width or a height <1 pixel. (That is, as there are n, n' pixels in the respective boundaries, the boundaries should not be divided into greater than n, n' subdivisions, respectively.) If so, processing continues at step 130 where an error message is displayed to display 22 indicating that no path can be found and processing ends.

As explained above, at step 122—after path finder 64 has determined that j and k pixels do exist on at least two boundaries—path finder 64 detects one or more suitable paths. This is done by determining whether a continuous path exists through j and k pixels linking the edges (C, D, E, F) of rectangle Z and thus a gap is present and can be identified. (Such a path can only go via j and k pixels; s pixels—being in a sense both j and k pixels—allow the path to change direction and thus move from j to k pixels.)

To do so, path finder 64 may start with any of the pixels on one edge of rectangle Z ($Cj_x$; $Dj_x$; $Ek_x$; or $Fk_x$) where x is the position of the pixel along the corresponding edge.

In this embodiment, path finder 64 operates with $Dj_x$ and $Ej_x$ lines of pixels—that is, a vertical line starting at edge D and a horizontal line starting at edge E. The process, for example, starts with $Dj_{10}$ (assuming it exists). If $Dj_{10}$ connects with one or more $Ej_x$, these connecting pixels are s pixels. Path finder 64 then moves down (vertically) to the s pixels furthest away from $Dj_{10}$ denoted here as $s_{x0}$. Path finder 64 then determines if moving horizontally, one of the vertical edges (E or F) can be reached. If so, a gap has been found and is the zigzagging line $Dj_{10}$–$s_{x0}$–$E_x$ assuming the edge E was reached at a pixel x. Many gaps may be found. The optimal path detector 66 detects the optimal path as explained below and the result is displayed.

If no edge cannot be reached by moving horizontally from $s_{x0}$, and other s pixels do not exist, a gap cannot be found starting from $Dj_{10}$. Path finder 64 then repeat the whole process from another $Dj_x$, say $Dj_{15}$ (assuming it exists).

However, if—still starting from $Dj_{10}$ and from $s_{x0}$—path finder 64 finds other s pixels along $Ek_x$ (i.e., the horizontal direction), path finder 64 moves horizontally to identify the furthest s pixel in the horizontal direction, say $s_{x1}$. From there path finder 64 moves vertically to identify the furthest s pixel in the vertical direction, say $s_{x2}$. Path finder 64 continues to move in this manner, alternating between horizontal and vertical movement, until it reaches another edge (say C). Thus, the analysis progresses between vertical and horizontal until a gap is found or path finder 64 can no longer progress, after which the next subdivision is analyzed.

It will be appreciated that the terms horizontal and vertical are used for convenience, and that alternatively other mutually perpendicular directions may be employed, or described in any other suitable terms.

Figure 10:
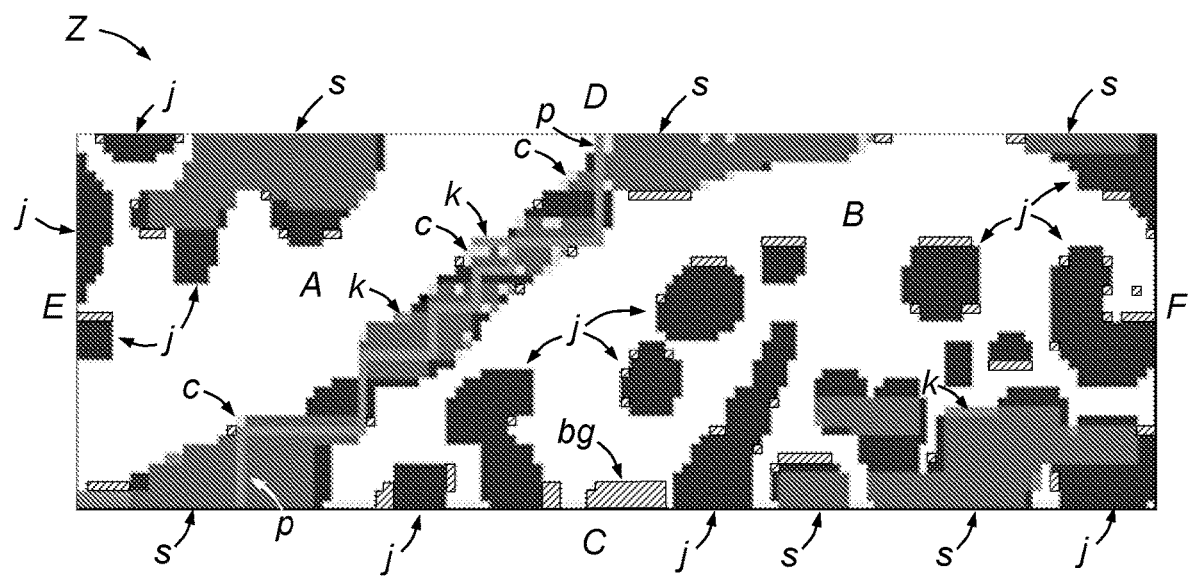
FIG. 10 illustrates the detection of a path between two objects in a rectangle Z comprising the intersection of the regions bounding the two objects, according to the image processing method implemented by the system of FIG. 1.

An example of this method, applied to selection Z of FIG. 9, is shown in FIG. 10. In this figure, the most heavily shaded regions correspond to j pixels, the lighter regions to s pixels, the still lighter regions to k pixels, the lightest shaded regions to the current (c) pixels, the white pixels to bone, and the shaded pixels (e.g. at bg) to background. (Background would commonly appear as black in such an image, but shading has been added to more clearly distinguish j pixels and background.) The path p is the zigzag line between A and B.

The resulting zigzag line p thus identifies a path between the edges C and D, and hence a gap that separates objects A and B. At this stage, optimal path detector 66 then validates the path as explained below and the result is displayed to display 22. It should be noted that many paths may be detected at the same time in a given analysis; optimal path detector 66 detects and validates the optimal path, as explained, and the result is saved to result file storage 72 and displayed by result output 68 to display 22.

If, for a given increment, path finder 64 cannot detect a gap, i and i' are increased. However, path finder 64 may in some cases increment i and i' to their respectively maximum values n and n' (corresponding to the vertical edge (E) and the horizontal edge (D)) without detecting a gap. This may occur if the threshold used to binarize the image was low—that is, although the threshold allowed successful identification of background pixels on the edges of the rectangle, it failed to 'open' the gap between the objects in the image. In such a case, the threshold value is increased by a preselected value, and the process of object separation is repeated. Additional increments of threshold values are performed until a gap is detected for the first time.

When a gap is then found, path finder 64 tests the validity of the gap is conducted. It does so by checking against predefined criteria. These criteria are established by reference to the attributes of, for example, the sample under examination. For example, if the sample comprises bone, the image regions divided by the gap should be contain a certain amount of bone tissue and the ratio of bone to muscle should reach a certain level; path finder 64 may compare such parameters and ratios with predefined thresholds and deem a path valid only if those thresholds are satisfied.

When multiple suitable paths or gaps are found, the optimal one is identified by optimal path detector 66. To find the best path from all the candidates, the optimization problem form may be established:

$$\text{minimize } f(x)$$
$$\text{subject to } g_i(x) \leq b_i, i = 1, \ldots, m$$

Here the vectors $x=(x_i, \ldots, x_n)$ are the path candidates, the function $f$ is the objective function, the function $g_i$, $i=1, \ldots, m$ are the constraint functions, and the constants $b_i$, $i=1, \ldots, m$ are the constraints. The path z is deemed optimal if it has the smallest object value among all candidates that satisfy the constraints: for any z with $g_1(x) \leq b_1, \ldots, g_m(x) \leq b_m$, we have $f(z) \geq f(x)$.

This formulation employs an objective function with the aim of achieving a maximum ratio of foreground (e.g. bone) to background (e.g. muscle) in the two regions divided by the path. Then, the optimal path is that path that maximizes this ratio. Some constraints may be imposed to make the aim more reasonable. For example, by the using the above objective function, the maximum ratio might be achieved when there is only one background pixel, but this may not be a desirable path, so a constraint may be defined such as that the background must contain at least a predefined (e.g. 30) number of pixels.

In one of the embodiments, the objective function could be inter-region variance (path(s) divide(s) the image into regions), within-region variance, or inter-region entropy, etc., or any combination of these. Here, regions are the image parts divided by the path. Variance or entropy could be calculated in the binarized or original image of the divided regions. Variance measures how far a set of pixels is spread out.

Entropy is a measure of the uncertainty of an event taking place. Achieving "inter-region entropy" is like achieving the maximum "difference" among different regions. When the maximum (or minimum) variance or entropy is achieved, the optimal path is obtained. The constraint function and constraint could be that each of the objects or regions to be separated (by the gap) should contain a significant number of pixels (e.g. at least 30 foreground pixels) of object A or object B.

Note, the above optimization constitutes defines a minimization problem. A maximization problem can be treated by negating the objective function.

The present invention is described in context of identifying a gap that allows separation of two objects, such as two bones or portions of bone, and in one example separating the radius from the ulna. It can however be used to identify a gap between any two structures, or a gap within a structure such as for example: (i) a fracture line that separates, for example, a bone into a plurality of fragments (thus allowing automated diagnosis or assistance for diagnosis of a fracture), (ii) a crack within a material, such as bone or concrete, (iii) a fissure, or (iv) a cortical discontinuity due to erosion of the cortical bone or cartilage discontinuity due to the erosion of cartilage (such as is observed in, for example, various forms of arthritis).

Another important feature and applications of this invention is that when the path(s) have been found, physical properties of the gap such as length, diameter, shape and area can be measured by counting the number pixels or quantifying the spatial organization of pixels. This may provide important information useful for the characterization of say the fracture line or the cartilage erosion. Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A computer-implemented method for identifying a gap between objects in an image, the method comprising:
    detecting contours of the objects in the image or in a binarized version thereof;
    locating at least one path or gap between the objects, in the image or in an intersection region being a portion of the image containing at least respective portions of the objects by:
        determining representative attenuations or densities of respective one or more rows and columns of the image or of the intersection region;
        identifying first pixels, being pixels in a column that has a representative attenuation or density of 0, second pixels, being pixels in a row that has a representative attenuation or density of 0, and third pixels both in a column that has a representative attenuation or density of 0 and in a row that has a representative attenuation or density of 0;
        determining whether there exists a path or gap between two or more boundaries by identifying at least one first or second pixel on each of two or more of the boundaries; and
    detecting one or more paths between the at least two boundaries; and
    outputting a result indicative of one or more detected paths;
    wherein identifying the at least one first or second pixel on each of two or more of the boundaries excludes the third pixels from consideration when analyzing subdivisions of the image or of the intersection region.

2. A method as claimed in claim 1, further comprising locating at least one path or gap between the objects in subdivisions of the image or of the intersection region, the subdivisions having a width and a height of at least one pixel, including determining representative attenuations or densities of the respective one or more rows and columns in the subdivisions.

3. A method as claimed in claim 1, further comprising any one or more of:
    i) equalizing a histogram of the image to produce an equalized image;
    ii) binarizing the image or a equalized version thereof to produce a binarized image;
    iii) filtering the image or a binarized version thereof to remove noise while retaining informative edges;
    iv) applying an erode kernel to the image or to a binarized version thereof;
    v) defining regions bounded by two or more longest of the contours; and
    vi) converting the image into a grey-scale image.

4. A method as claimed in claim 1, wherein locating the at least one path or gap includes attempting to locate at least one path or gap in the image, in the intersection region, in one or more of any subdivisions thereof, in a plurality of the subdivisions, or in all of the subdivisions.

5. A method as claimed in claim 1, comprising determining whether a path or gap is likely to exist between a plurality of boundaries of the image or of the intersection region by identifying pixels on two or more of the boundaries with values indicative of background pixels.

6. A method as claimed in claim 5, including repeatedly binarizing the intersection region with the binarization threshold successively increased until it is determined whether the path or gap is likely to exist.

7. A method as claimed in claim 1, comprising defining a plurality of sets of subdivisions of respective sizes.

8. A method as claimed in claim 1, wherein the representative attenuations or densities are average attenuations or densities.

9. A non-transitory computer readable medium, comprising a computer program configured, when executed by one or more processors, to implement the method of claim 1.

10. A system for identifying a gap between objects in an image, the system comprising:
    a contour detector configured to detect contours of the objects in the image or in a binarized version thereof;
    a path finder configured to locate at least one path or gap between the objects, in the image or in an intersection region being a portion of the image containing at least respective portions of the objects by:
        determining representative attenuations or densities of respective one or more rows and columns of the image or of the intersection region;
        identifying first pixels, being pixels in a column that has a representative attenuation or density of 0, second pixels, being pixels in a row that has a representative attenuation or density of 0, and identifying third pixels, being pixels both in a column that has a representative attenuation or density of 0 and in a row that has a representative attenuation or density of 0;
        determining whether there exists a path or gap between two or more boundaries by identifying at least one first or second pixel on each of two or more of the boundaries; and
    detecting one or more paths between the at least two boundaries; and
    an output configured to output a result indicative of one or more detected paths;
    wherein the path finder is configured to exclude the third pixels from consideration when analyzing the subdivisions to identify the at least one first or second pixel on each of two or more of the boundaries.

11. A system as claimed in claim 10, wherein the path finder is further configured to locate at least one path or gap between the objects in subdivisions of the image or of the intersection region, the subdivisions having a width and a height of at least one pixel, including determining representative attenuations or densities of the respective one or more rows and columns in the subdivisions.

12. A system as claimed in claim 10, further comprising any one or more of:
    i) an image equalizer configured to equalize a histogram of the image to produce an equalized image;
    ii) an image binarizer configured to binarize the image or a equalized version thereof to produce a binarized image;
    iii) a filter configured to filter the image or a binarized version thereof to remove noise while retaining informative edges;
    iv) an erode kernel applicator configured to apply an erode kernel to the image or to a binarized version thereof;

v) a region definer configured to define regions bounded by two or more longest of the contours; and vi) a grey-scale converter configured to convert the image into a grey-scale image.

13. A system as claimed in claim 10, wherein the path finder is further configured to attempt to locate at least one path or gap in the intersection region and in one or more of the subdivisions, or in a plurality of the subdivisions.

14. A system as claimed in claim 13, wherein the path finder is further configured to attempt to locate at least one path or gap in the intersection region and in all of the subdivisions.

15. A system as claimed in claim 10, wherein the path finder is further configured to define a plurality of sets of subdivisions of respective sizes.

16. A system as claimed in claim 10, wherein the representative attenuations or densities are average attenuations or densities.

17. A system as claimed in claim 10, further comprising an optimal path detector configured to detect one or more optimal paths from the detected paths.

18. A system as claimed in claim 10, wherein the path finder is further configured to determine whether a path or gap is likely to exist between a plurality of boundaries of the image, or of the intersection region by identifying pixels on two or more of the boundaries with values indicative of background pixels.

19. A system as claimed in claim 18, wherein the image binarizer is configured to repeatedly binarize the intersection region with the binarization threshold successively increased until the image binarizer determines whether the path or gap is likely to exist.

20. A system for identifying a gap between objects in an image, the system comprising:

a processor configured to:

(a) detect contours of the objects in the image or in a binarized version thereof; and (b) locate at least one path or gap between the objects, in the image or in an intersection region being a portion of the image containing at least respective portions of the objects by:

determining representative attenuations or densities of respective one or more rows and columns of the image or of the intersection region;

identifying first pixels, being pixels in a column that has a representative attenuation or density of 0, second pixels, being pixels in a row that has a representative attenuation or density of 0, and identifying third pixels, being pixels both in a column that has a representative attenuation or density of 0 and in a row that has a representative attenuation or density of 0;

determining whether there exists a path or gap between two or more boundaries by identifying at least one first or second pixel on each of two or more of the boundaries; and detecting one or more paths between the at least two boundaries; and an output configured to output a result indicative of one or more detected paths;

wherein the processor is further configured to exclude the third pixels from consideration when analyzing the subdivisions to identify the at least one first or second pixel on each of two or more of the boundaries.

\* \* \* \* \*